United States Patent [19]

Pringle et al.

[11] Patent Number: 5,542,472

[45] Date of Patent: Aug. 6, 1996

[54] METAL COILED TUBING WITH SIGNAL TRANSMITTING PASSAGEWAY

[75] Inventors: Ronald E. Pringle; Winfield M. Sides, III; David N. Folsom, all of Houston; Cecil G. McGavern, III, Humble, all of Tex.

[73] Assignee: Camco International, Inc., Houston, Tex.

[21] Appl. No.: 402,679

[22] Filed: Feb. 27, 1995

Related U.S. Application Data

[63] Continuation-in-part of Ser. No. 300,761, Sep. 8, 1994, which is a continuation-in-part of Ser. No. 142,637, Oct. 25, 1993, abandoned.

[51] Int. Cl.$^6$ ............................................. E21B 23/00
[52] U.S. Cl. .................................... 166/65.1; 166/77.2
[58] Field of Search ........................... 166/384, 385, 166/77.2, 77.3, 77.4, 202, 65.1

[56] References Cited

U.S. PATENT DOCUMENTS

| | | | |
|---|---|---|---|
| 4,463,814 | 8/1984 | Horstmeyer et al. | 175/45 |
| 4,844,166 | 7/1989 | Going et al. | 166/379 |
| 4,863,091 | 9/1989 | Dubois | 228/147 |
| 5,269,377 | 12/1993 | Martin | 166/385 |
| 5,284,682 | 2/1993 | Delacour et al. | 166/385 |
| 5,285,204 | 2/1994 | Sas-Jaworsky | 340/854.9 |

Primary Examiner—William P. Neuder
Attorney, Agent, or Firm—Fulbright & Jaworski L.L.P.

[57] ABSTRACT

A combination of a metal coiled tubing and a signal transmitting passageway for transmitting and/or receiving signals to well tools positioned in the coiled tubing. The signal transmitting passageway is positioned in the wall of the coiled tubing and may transmit and receive hydraulic, electrical or light signals and the signals may be used for transmitting power signals for actuating well tools, control signals for controlling well tools, and/or data signals for transmitting or receiving information.

16 Claims, 6 Drawing Sheets

FIG. 14

METAL COILED TUBING WITH SIGNAL TRANSMITTING PASSAGEWAY

CROSS-REFERENCE TO RELATED APPLICATIONS

The present invention is a continuation in part of application Ser. No. 08/300,761, filed Sep. 8, 1994, entitled Coiled Tubing With Signal Transmitting Passageway which was a continuation in part of No. 08/142,637, filed Oct. 25, 1993, abandoned, entitled Coiled Tubing With Control Conduit and Manufacture Thereof.

BACKGROUND OF THE INVENTION

The present invention is directed to the combination of a metal coiled tubing and a signal transmitting passageway for transmitting and/or receiving signals to well tools positioned in the coiled tubing. The signal transmitting passageway may transmit and receive hydraulic, electrical, or light signals and the signals may be used for transmitting power signals for actuating well tools, control signals for controlling well tools, and/or data signals for transmitting and/or receiving information. The signal transmitting passageway is positioned in the wall of the coiled tubing and out of the center of the bore of the coiled tubing for avoiding interference with passage of equipment through the coiled tubing, and in addition, the signal transmitting passageway does not create any protuberances on the exterior of the coiled tubing which would interfere with its passage through wellhead injectors.

Metal coiled tubing is utilized in oil and/or gas wells by being reeled into and out of a production tubing string for performing many types of operations. In addition, using various types of well tools in a coiled tubing requires a signal transmitting passageway, conduit or line, to be utilized either outside or inside of the coiled tubing, such as disclosed in U.S. Pat. Nos. 4,844,166 and 5,285,851. However, such a coiled tubing and signal transmitting passageway must be flexible so as to be spoolable on a coiled tubing reel and is also important that the bore of the coiled tubing be clear to allow the passage of required wireline tools therethrough such as bottom hole survey or temperature tools.

However, prior outside signal transmitting passageways, such as hydraulic lines, are undesirable and subject to being damaged on being injected through wellhead equipment. Prior inside positioned signal transmitting passageways, such as hydraulic and electrical lines, are free flowing and coiled for specific lengths to accommodate expansion and contraction and therefore interfere with the passage of other well tools therethrough. These problems increase in those spoolable well completions wherein it is desired to run more than one signal transmitting passageway in combination with coiled tubing.

The present invention is directed to various embodiments of a combination of coiled tubing and signal transmitting passageway which will maintain the passageway out of the center of the bore of the coiled tubing thereby allowing free passage of other well tools through the bore, but still providing a flexible and spoolable combination which will readily pass through wellhead injectors by providing a smooth exterior on the coiled tubing and may be capable of transmitting various types of signals such as hydraulic, electrical, and optical.

SUMMARY

One object of the present invention is the provision of a combination of a metal coiled tubing and a signal transmitting passageway for transmitting and/or receiving signals to well tools positioned in the coiled tubing. The flexible coiled tubing includes an outer diameter, an inner diameter, and a bore therethrough and is adapted to support at least one signal actuated well tool therein. The coiled tubing includes at least one signal transmitting passageway positioned in the coiled tubing between the inner diameter and the outer wall. In one embodiment, at least two separate signal transmitting passageways are positioned between the inner diameter and the outer diameter. The signal transmitting passageway may be adapted to conduct hydraulic fluid, electrical signals, or light signals.

Yet a further object of the present invention is wherein the signal transmitting passageway is positioned approximately midway between the inner diameter and the outer diameter.

Still a further object of the present invention is wherein the cross-sectional area of the passageway is oval-shaped with a major axis and a minor axis with the minor axis extending radially. Preferably, the oval shape is substantially elliptical. And preferably the length of the major axis is substantially no greater than twice the length of the minor axis.

In another embodiment, the signal transmitting passageway is positioned against the outer diameter of the coiled tubing. In one embodiment the signal transmitting means is bonded in the passageway.

A still further object of the present invention is wherein the signal transmitting passageway extends from the outer diameter towards the inner diameter and the cross-sectional area at the outer diameter is less than the cross-sectional area of the passageway whereby the signal transmitting means may be securely held in the passageway.

Still a further object of the present invention is the provision of one or more protective ribs extending transversely to the outer wall between adjacent signal passageways for protection of the passageways.

A still further object of the present invention is the provision of a combination of a metal coiled tubing and a signal transmitting passageway for transmitting and/or receiving signals to well tools positioned in the coiled tubing in which a flexible coiled tubing having an outer diameter, an inner diameter, and a bore therethrough is adapted to support at least one signal actuated well tool having a bore in communication with the bore of the coiled tubing. An annular signal transmitting passageway is formed between the inner diameter and the outside of a concentric tube coaxially positioned in the inside of the coiled tubing. In one embodiment the signal transmitting annular passageway is formed to conduct hydraulic fluid.

Yet a further object of the present invention is the provision of a combination of a metal coiled tubing and a signal transmitting passageway for transmitting and/or receiving signals to well tools positioned in the coiled tubing. A flexible coiled tubing having an outer diameter, an inner diameter, and a bore therethrough is adapted to support at least one signal actuated well tool having a bore in communication with the bore of the coiled tubing. A signal transmitting passageway is formed by circularly wrapping a conduit around the outside of the outer diameter of the coiled tubing and encapsulated with a coating providing a smooth outer circumference. In one embodiment, more than one conduit is circularly wrapped around the exterior of the outer diameter of the coiled tubing.

Other and further objects, features and advantages will be apparent from the following description of presently preferred embodiments, given for the purpose of disclosure, and taken in conjunction with the accompanying drawings where like character references designate like parts throughout the several views.

DESCRIPTION OF THE PREFERRED EMBODIMENTS

Figure 1:
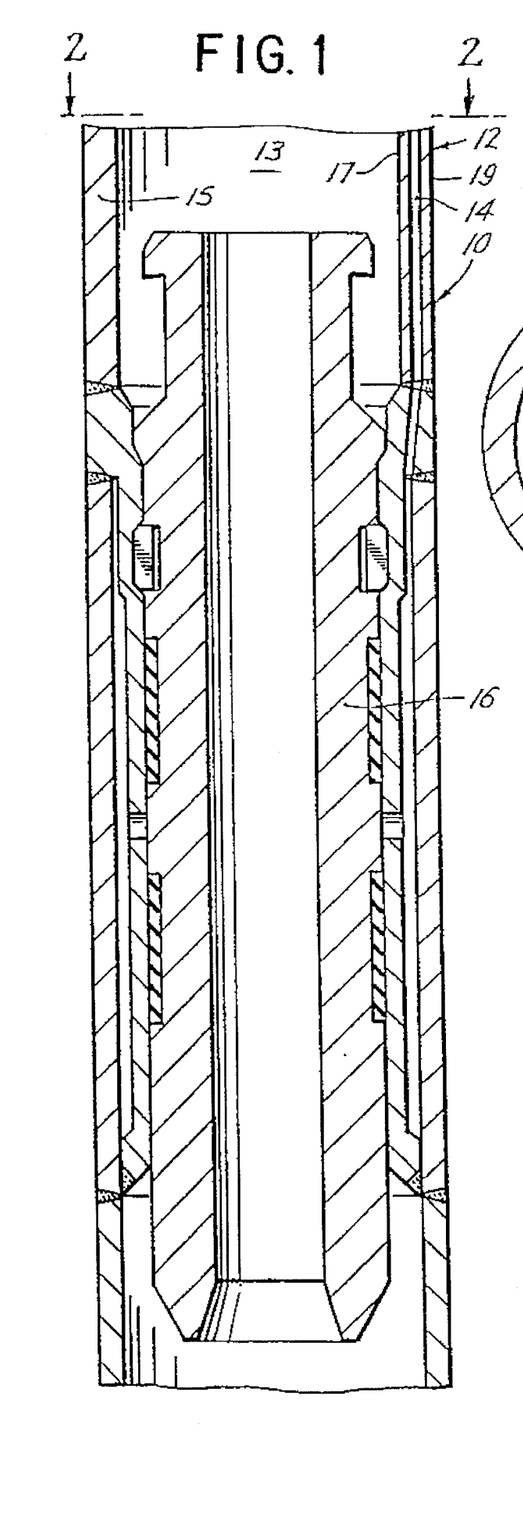
FIG. 1 is an elevational view, in cross section, of a portion of a spoolable well completion system utilizing the combination of a coiled tubing and a signal transmitting passageway, here shown as a hydraulic control passageway, of the present invention.
Figure 2:
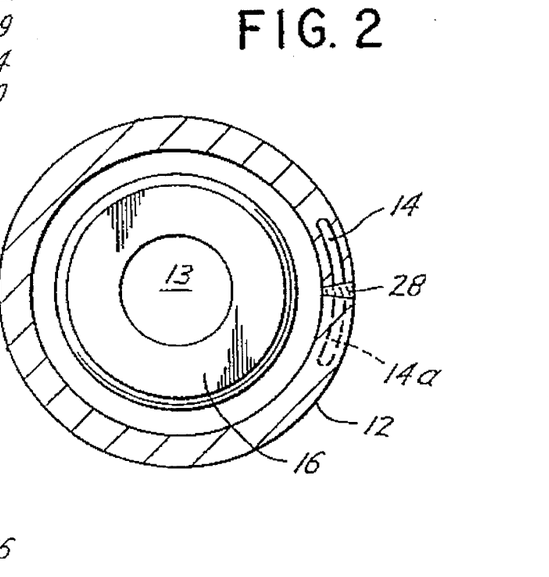
FIG. 2 is a cross-sectional view taken along the line 2—2 of FIG. 1.

Referring now to the drawings, and particularly to FIGS. 1 and 2, the reference numeral 10 generally indicates a portion of a spoolable well completion system and generally includes a metal coiled tubing 12 having one or more signal transmitting passageways such as hydraulic control conduits, passageways, or lines 14 and 14a (FIG. 2) for hydraulically controlling one or more well tools positioned in the coiled tubing, such as a hydraulically actuated well tool 16. The hydraulically actuated well tool 16 may be any suitable well tool, such as Camco Model CTSP hydraulically actuated well safety valve. The coiled tubing 12 includes a wall 15 having an inner diameter 17, an outer diameter 19, and a coaxial bore 13 therethrough. The completion system 10 may include various other types of well tools, such as sliding sleeves, gas lift valves, and other tools (not shown). The coiled tubing 12 may be any suitable metal such as high carbon steel. The metal coiled tubing 12 has the advantages over composite type cables of (1) withstanding higher burst and collapse pressures to which the tubing is subject, (2) greater tensile strength, and (3) allowing greater pressure to be provided in the signal transmitting passageway.

As previously discussed, the use of hydraulic or electrical control lines for actuating electrical or hydraulically operated well tools have been provided by utilizing separate electrical or hydraulic lines on either the outside of the coiled tubing 12 or on the inside of the coiled tubing 12. Signal transmitting passageways, conduits or lines on the outside of the coiled tubing 12 present problems in sealing against the outer diameter 19 of the coiled tubing 12 while inserting the coiled tubing 12 into a well through conventional wellhead equipment, such as an injector head. Placing the signal transmitting signal line inside the coiled tubing creates a free floating and coiled line allowing for expansion and contraction, but which interferes with the open bore 13 in the coiled tubing 12. That is, it is desirable to pass other well tools, such as bottom hole survey or temperature tools, downwardly through the bore 13 of the coiled tubing 12, such as on wireline systems. In such an event, it is desired that the coaxial longitudinal bore 13, particularly along the longitudinal axis be free of obstructions. The hydraulic control lines 14 and/or 14a in the embodiment of FIGS. 1 and 2 provide a hydraulic signal transmitting passageway or lines within the wall 15 of the coiled tubing between the inner diameter 17 and the outer diameter 19 which is particularly advantageous as it does not interfere with the spoolability of the coiled tubing 12, does not create any upsets or protuberances on the outside for outer diameter 19 of the coiled tubing 12, nor does it interfere with the passage of wireline tools through the coaxial bore 13 of the coiled tubing 12. As illustrated, the hydraulic signal passageway 14 is utilized to provide hydraulic control fluid to the well safety valve 16 for opening and closing the safety valve. The second hydraulic signal passageway 14a (FIG. 2) may be run longitudinally downwardly within the wall 15 and through the coiled tubing 12 to operate other types of well tools (not shown).

Figure 3:
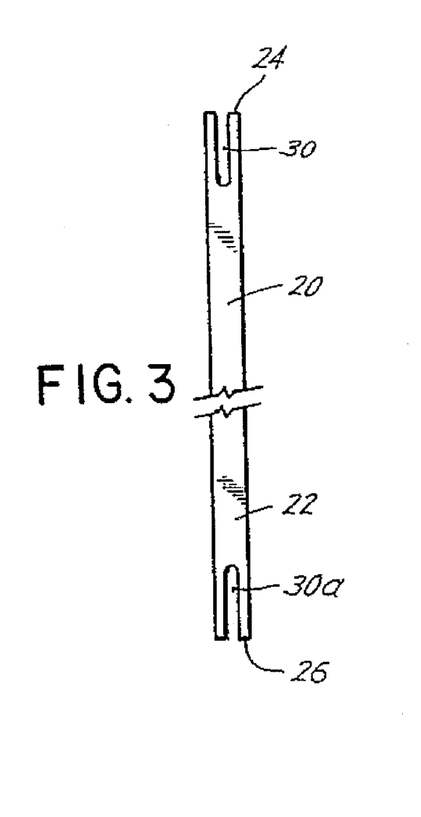
FIG. 3 is an elevational view of a flat metal plate showing the first step in the manufacture of the combination coiled tubing and signal transmitting passageway of FIG. 1.

Referring now to FIG. 3, one method of manufacturing the coiled tubing 12 along with the signal transmitting passageways 14 and 14a of FIGS. 1A–1C and 2, is best seen in FIG. 3, in which a flat elongate metal plate 20 having an end 22 and first and second edges 24 and 26 is shown in end view. A single groove 30 or an additional groove 30a, providing one passageway or two passageways, may be provided in the edges 24 and 26, respectively. The plate 20 is then rolled in the form of a circle around its longitudinal axis, and, as best seen in FIG. 2, a longitudinal weld 28 is used to weld the edges 24 and 26 together. The weld 28 provides a barrier between the grooves 30 and 30a thereby forming passageways 14 and 14a. Of course, the lengths of the passageways 14 and 14a may be of any desired length and may be different from each other as required for the particular well completion system 10. The top of the passageways 14 and 14a thus extend into a wellhead (not shown) for supplying the desired hydraulic control fluid to the passageways 14 and 14a.

Other and further embodiments may be provided as hereinafter described were like parts to those shown in FIGS. 1 through 3 will be similarly numbered with the addition of the suffix "a", "b", "c", "d", "e", "f", "g", "h" and "i".

Figure 4:
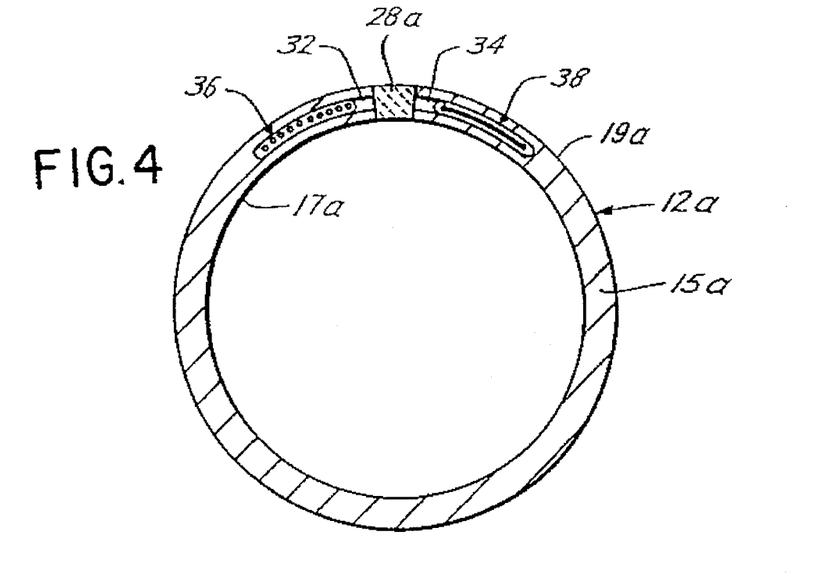
FIG. 4 is a cross-sectional view similar to FIG. 2 illustrating the use of a combination of hydraulic signal passageways, electrical signal passageway, and a fiber optic signal passageway in the wall of a coiled tubing.
Figure 4A:
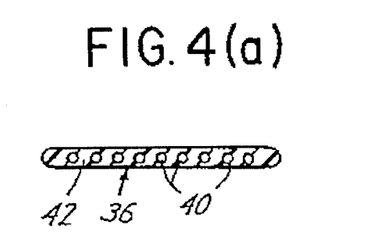
FIG. 4A is an enlarged cross-sectional view of one of the signal transmitting passageways of FIG. 4.
Figure 4B:
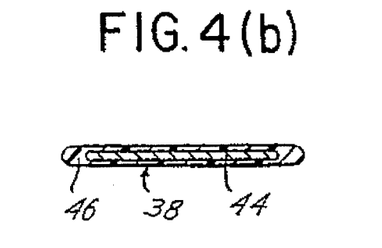
FIG. 4B is an enlarged cross-sectional view of another of the signal transmitting passageways of FIG. 4.

Referring now to FIGS. 4, 4A and 4B, a plurality of different signal transmitting passageways are provided within the wall of the coiled tubing 12a between the inner diameter 17a and the outer diameter 19a. Hydraulic passageways 32 and 34 are provided, a fiber optic passageway 36 is provided and an electrical signal transmitting passageway 38 is provided. As best seen in FIG. 4A, the fiber optic cable 36 consists of a plurality of fiber optic lines 40 enclosed within a suitable insulation 42. As best seen in FIG. 4B, the electrical line may include a flat ribbon wire 44 enclosed with a suitable insulation 46. Thus, various data and power transmitting signals may be conducted through the wall 15a of the coiled tubing 12a to various downhole well tools (not shown).

Figure 5:
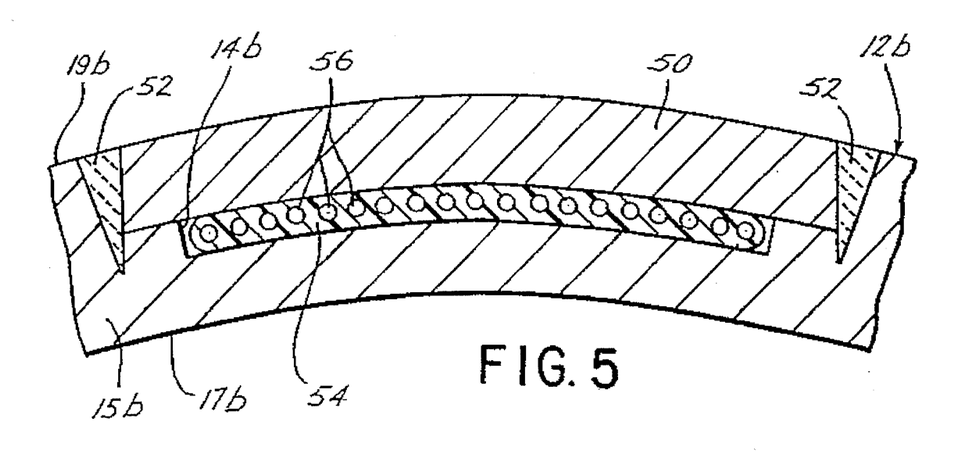
FIG. 5 is an enlarged fragmentary cross-sectional view of another embodiment of a signal transmitting passageway in the wall of a coiled tubing.

Referring to FIG. 5, another embodiment is shown in which a signal transmitting passageway 14b is formed between the inner diameter 17b and the outer diameter 19b of a coiled tubing 12b by cutting a portion of the outer diameter 19b longitudinally out of the exterior of the coiled tubing 12b. The passageway 14b is then formed by placing a closure plate 50 therein such as by welds 52 extending along the edges of the closure plate 50. While, of course, the passageway 14b may be left empty for conducting hydraulic fluid therethrough other types of signal transmitting means may be inserted in the passageway 14b, such as means 54 in which the signal transmitting elements 56 may be fiber optic cables or multiple strands of electrical wire.

Figure 6:
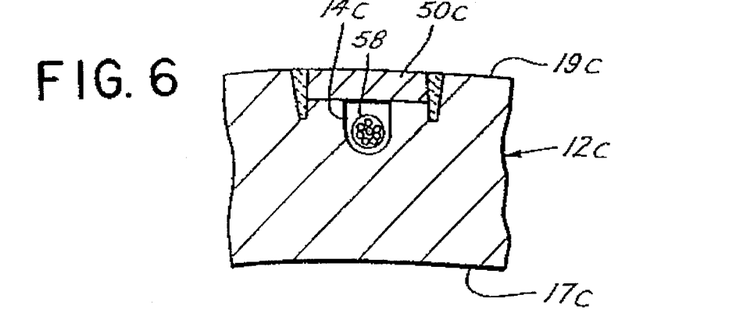
FIG. 6 is an enlarged fragmentary cross-sectional view of another embodiment of a signal transmitting passageway in the wall of a coiled tubing.

In FIG. 6, a closure plate 50c is welded into the outer diameter 19c of a coiled tubing 12c enclosing a fiber optic bundle 58.

Figure 7:
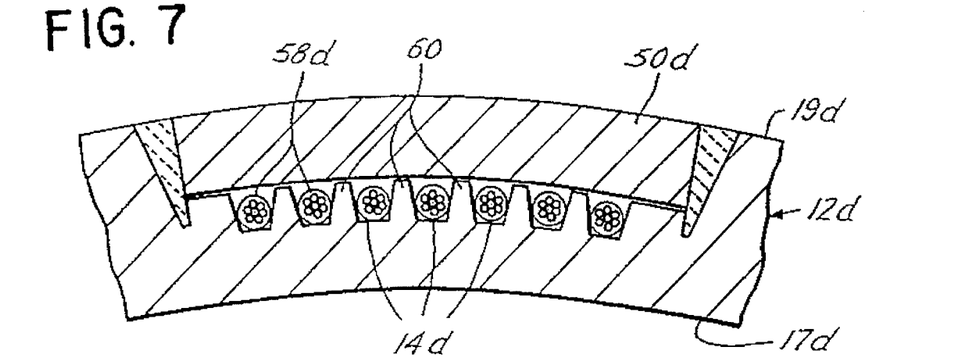
FIG. 7 is a fragmentary cross-sectional view of still a further embodiment of the placement of a plurality of signal transmitting passageways within the wall of a coiled tubing.

Referring to FIG. 7, a closure plate 50d encloses a plurality of passageways 14d which are separated from each other by protective ribs 60. Various types of signal transmitting means 58d may be provided in the individual passageways 14d, such as single electrical wires or fiber optic lines.

Figure 8:
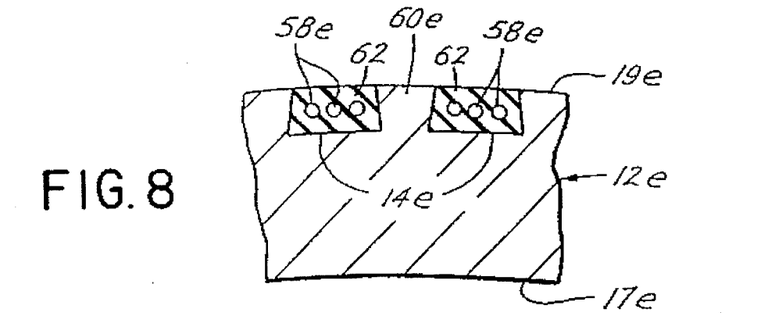
FIG. 8 is a fragmentary cross-sectional view of a further embodiment of a signal transmitting passageway in the wall of a coiled tubing.

Referring now to FIG. 8, the signal transmitting passageways 14e are positioned against the outer diameter 19e of the coiled tubing 12e and extend from the outer diameter 19e inwardly. In the event that a plurality of passageways 14e are desired a protective rib 60e is provided between adjacent passageways 14e for protecting the signal transmitting means 58e. The transmitting means 58e are preferably enclosed by a suitable rubber filler 62 which is bonded and holds the transmitting means 58e in place in the passages 14e by being bonded therein.

Figure 9:
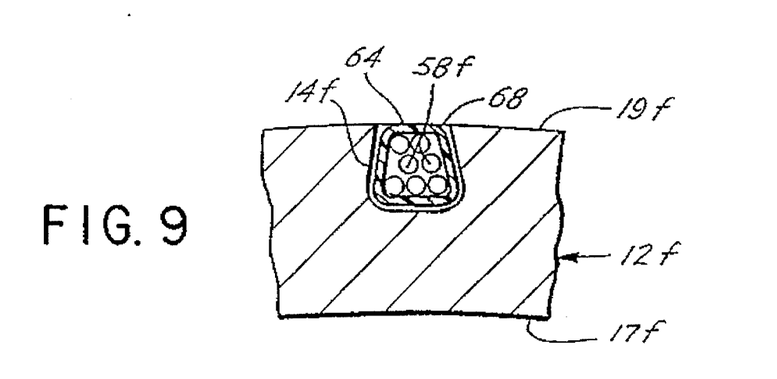
FIG. 9 is a fragmentary cross-sectional view of yet a further placement of a signal transmitting means in the wall of a coiled tubing.

Referring to FIG. 9, a signal transmitting passageway 14f extends from the outer diameter 19f towards the inner diameter 17f of the coiled tubing 12f. The cross-sectional area 64 at the outer diameter 19f is less than other cross-sectional areas of the passageway 14f whereby the signal transmitting means 58f may be held in the passageway 14f. The signal transmitting means 58f may include any suitable signal means, such as electrical lines or fiber optic lines which are covered by a plastic cover 68. The shape of the passageway 14f allows the signal transmitting means 58f to be inexpensively snapped into place in the passageway 14f and securely held therein.

Figures 10, 11:
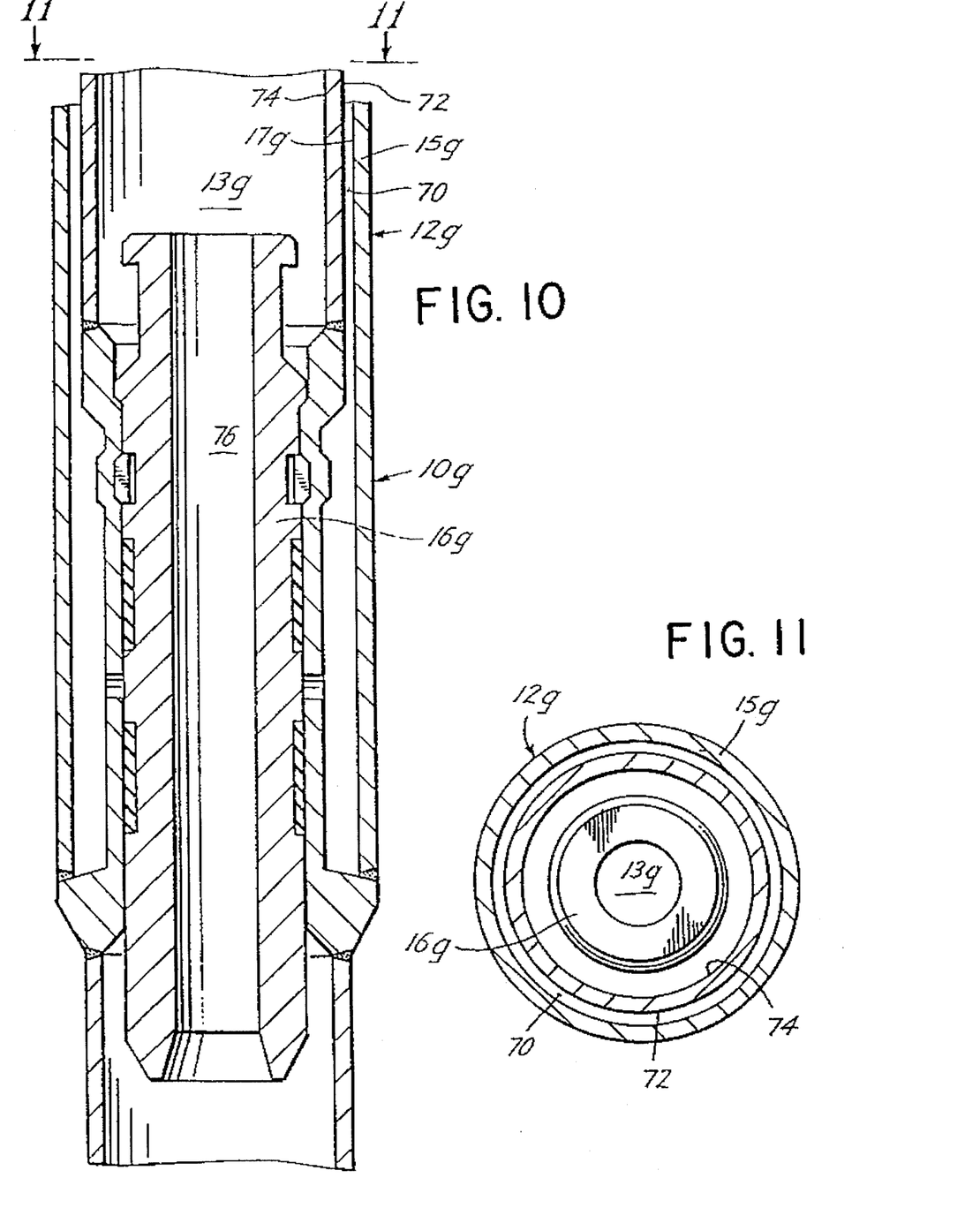
FIG. 10 is an elevational view, in cross section, of another embodiment of the combination of a coiled tubing and a signal transmitting passageway.
FIG. 11 is a cross-sectional view taken along the line 11—11 of FIG. 10.

Referring now to FIGS. 10 and 11, a spoolable well completion system 10g is shown having a coiled tubing 12g, a hydraulic signal transmitting passageway conduit or line 70 for supplying hydraulic fluid to a hydraulically actuated well tool, such as safety valve 16g. The signal transmitting passageway 70 is a concentric annulus which is provided between the inside diameter 17g of the coiled tubing 12g and the outside diameter 72 of a tubular member 74 which is concentrically positioned inside of the coiled tubing 12g. Again, the concentric annulus hydraulic signal passageway 70 meets the desired criteria of not being outside of the wall 15g and not interfering with the coaxial passage of well tools through the bore 13g which is in communication with the bore 76 of the well tool 16g.

Figure 12:
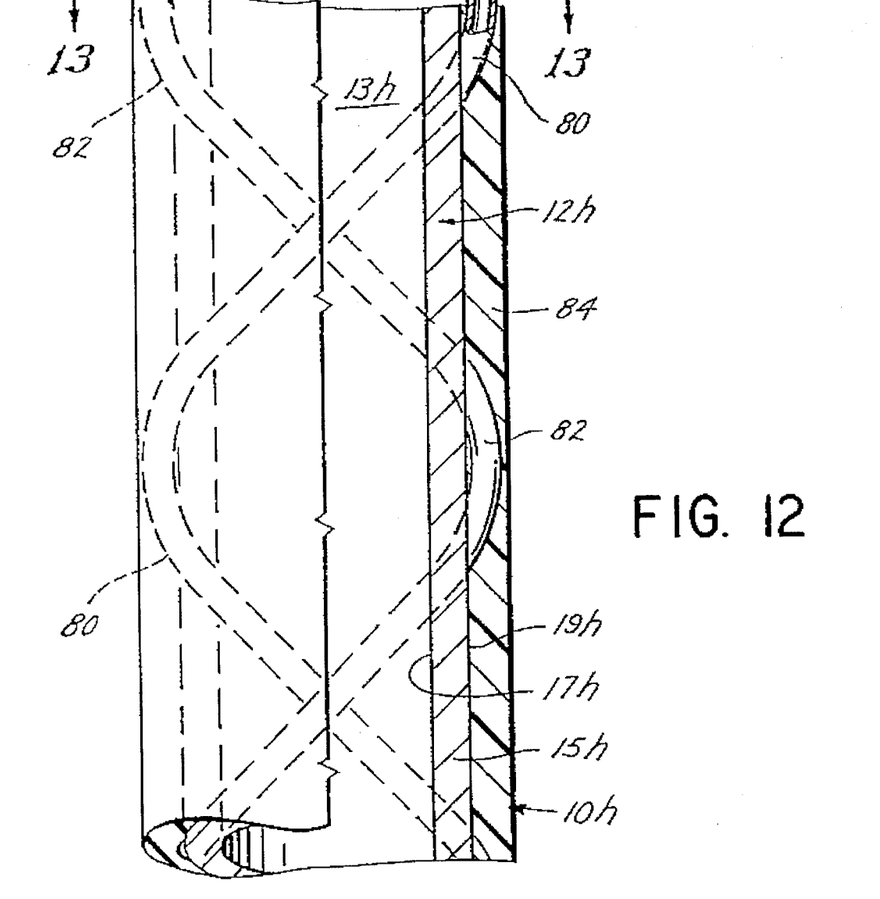
FIG. 12 is an elevational view, in cross section, of still a further embodiment of the present invention.
Figure 13:
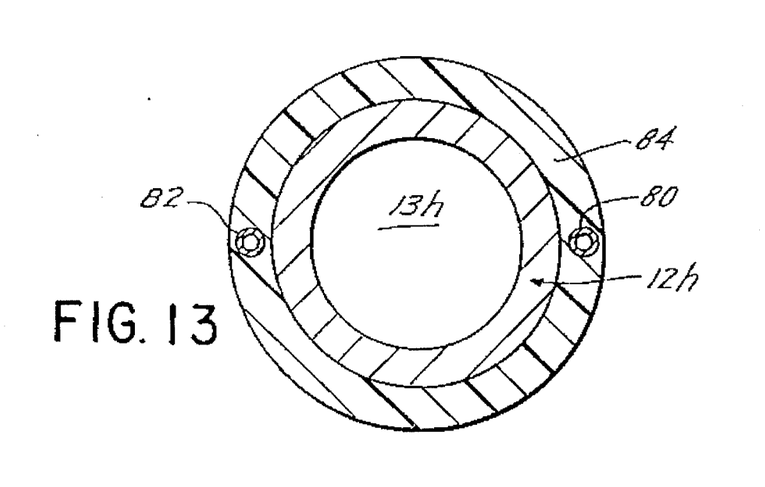
FIG. 13 is a cross-sectional view, taken along the line 13—13, of FIG. 12.

Referring to another embodiment, as best seen in FIGS. 12 and 13, a coiled tubing 12h is provided having a slightly reduced internal diameter 17h which provides for an open bore 13h therethrough. In this embodiment, one or more hydraulic signal transmitting passageways, conduits or lines 80 and 80a are helically wound around the outside diameter 19h of the coiled tubing 12h. The circular wrapping of the hydraulic passageways 80 and 82 provides added strength to the structure. The circular wrapped controlled lines 80 and 82 are then encapsulated with an outer cover 84 made out of a suitable strength providing plastic cover made of any suitable material, such as PEEK fiber composite or Ryton "PPS" (polyphenylene sulfide), long fiber reinforced composite, the cover 84 provides a smooth exterior with a non-upset circumference which will readily pass through an injector in a wellhead and at the same time will protect the control lines 80 and 82 from damage while also providing the necessary strength for gripping by hanging means for supporting the coiled tubing 12h.

In considering communication through a signal transmitting passageway in the wall of a metal coiled tubing, various shaped cross-sectional areas are available for consideration. It has been hypothesized that a circular or round cross-sectional area would provide optimum flow and pressure vessel characteristics. Areas of particular concern are the size of the passageway (that is, area), the capacity of the passageway to contain pressure (for the hydraulic communication mode), and the impact on overall integrity of the metal coiled tubing. However, circular geometry in the wall of the coiled tubing behaves like a stress relief in that on either side of the passageway, in the tangential direction, tubing stress under burst or collapse pressure is near zero. It has been found that within limits, the pressure capacity of the passageway is inversely proportional to its tangential width while coiled tubing integrity is inversely proportional to the radial height of the passageway. At the same time, the size of the passageway is dependent upon its height and width. Therefore, referring to FIG. 14, the preferred embodiment of the cross-sectional shape of the passageway 14i is oval-shaped with a major axis 90 and a minor axis 92 with the minor axis 92 extending radially and the major axis 90 extending tangentially. It has been found that the ovalshaped passageway 14i, which is preferably elliptical-shaped, can be widened out to width w, as compared to a circular passageway, into the low stress region so that the maximum area can be obtained with a minimum passage height h. Therefore, the oval design can be used which optimizes the pressure capacity of the passageway 14i maximizes its size, and minimizes its impact on the metal coiled tubing 12i. Thus, the oval or elliptical shape provides a stronger design than a round passageway of equivalent area.

As a result, an optimized elliptical passageway 14i can be provided with sufficient area that will withstand high pressure applications while having little to no impact on the burst and collapsed pressures of the tubing 12i itself. For example only, an elliptical passageway 14i in a 2⅜ OD×0.190 inch wall metal coiled tubing having a width w of 0.080 inches and a height h of 0.040 inches has a pressure capacity in excess of 15,000 psi while having no observable impact on published collapse and burst pressures for the tubing 12$i$. While the ellipse passageway 14$i$ is advantageous for all types of signals being transmitted therethrough, it is additionally advantageous in the case of hydraulic fluid control as it has flow characteristics that would provide downhole well tool operations such as safety valves with comparable closing times to those of a standard control line operated safety valve. In the example shown in FIG. 14, the outside diameter D of the coiled tubing 12$i$ is 2.375 inches and the thickness t of the wall 15$i$ is 0.156 inches and the distance D from the outside 14$a$ of the centroid of the ellipse is t/2. The area of the passageway 14$a$ is $2.513 \times 10^{-3}$.

Figure 14:
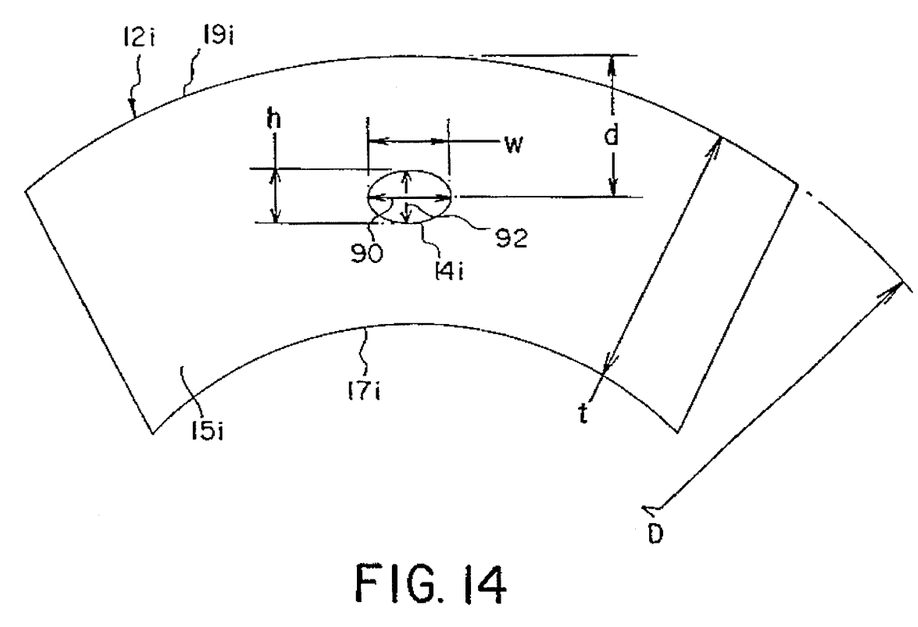
FIG. 14 is an enlarged fragmentary cross-sectional view of another embodiment of a signal transmitting passageway in the wall of a coiled tubing.

It is to be noted in the example given, that the length of the major axis 90 is twice the length of the minor axis 92. It is preferable that this ratio be substantially no greater than two in order to optimize the area while still withstanding high pressure applications.

The present invention, therefore, is well adapted to carry out the objects and attain the ends and advantages mentioned as well as others inherent therein. While presently preferred embodiments of the invention have been given for the purpose of disclosure, numerous changes in the details of construction and arrangement of parts, will readily suggest themselves to those skilled in the art, and which are encompassed within the spirit of the invention and the scope of the appended claims.

What is claimed is:

1. A combination of a coiled tubing and a signal transmitting passageway for transmitting and/or receiving signals to well tools positioned in the coiled tubing comprising, a flexible coiled tubing having an outer diameter, an inner diameter, and a bore therethrough and adapted to support at least one signal actuated well tool therein, and said coiled tubing having at least one signal transmitting passageway positioned in the coiled tubing between the inner diameter and the outer diameter.

2. The apparatus of claim 1 wherein at least two separate signal transmitting passageways are positioned between the inner diameter and the outer diameter.

3. The apparatus of claim 1 including, a protective rib extending transversely relative to the outer diameter between adjacent passageways for protection of the passageways.

4. The apparatus of claim 1 wherein the signal transmitting passageway is formed to conduct hydraulic fluid.

5. The apparatus of claim 1 wherein the signal transmitting passageway includes an electrical wire.

6. The apparatus of claim 1 wherein the signal transmitting passageway includes a fiber optic cable.

7. The apparatus of claim 1 wherein the signal transmitting passageway is positioned approximately midway between the inner diameter and the outer diameter.

8. The apparatus of claim 1 wherein the cross-sectional area of the passageway is oval-shaped with a major axis and a minor axis with the minor axis extending radially.

9. The apparatus of claim 8 wherein the oval shape is substantially elliptical.

10. The apparatus of claim 8 wherein the length of the major axis is substantially no greater than twice the length of the minor axis.

11. The apparatus of claim 1 wherein the signal transmitting passageway is positioned against the outer diameter of the coiled tubing.

12. The apparatus of claim 11 wherein signal transmitting means is bonded in the passageway.

13. The apparatus of claim 11 wherein the signal transmitting passageway extends from the outer diameter toward the inner diameter and the cross-sectional area of the signal transmitting passageway at the outer diameter is less than other cross-sectional areas of the passageway whereby signal transmitting means may be held in the passageway.

14. A combination of a metal coiled tubing, and a signal transmitting passageway for conducting hydraulic fluid to actuate well tools positioned in the coiled tubing comprising, a flexible coiled tubing having an outer diameter, an inner diameter, and a bore therethrough and adapted to support at least one signal actuated well tool having a bore in communication with a hydraulic operating mechanism of the well tool, and an annular signal transmitting passageway formed between the inner diameter and the outside of a concentric tube coaxially positioned in the inside of the coiled tubing.

15. A combination of a metal coiled tubing, and a signal transmitting passageway for transmitting and/or receiving signals to well tools positioned in the coiled tubing comprising, a flexible coiled tubing having an outer diameter, an inner diameter, and a bore therethrough and adapted to support at least one signal actuated well tool, and a signal transmitting passageway circularly wrapped around the outside of the outer diameter of the coiled tubing and a coating encapsulating said signal transmitting passageway and exhibiting a smooth outer circumference.

16. The apparatus of claim 15 including more than one signal transmitting passageway circularly wrapped around the outside of the outer diameter of the coiled tubing.

* * * * *